US010385730B2

(12) United States Patent
Acius et al.

(10) Patent No.: US 10,385,730 B2
(45) Date of Patent: Aug. 20, 2019

(54) STIFFENING RIB

(71) Applicant: Rolls-Royce Corporation, Indianapolis, IN (US)

(72) Inventors: Aric Acius, Indianapolis, IN (US); Robert Biel, Mccordsville, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 723 days.

(21) Appl. No.: 14/962,448

(22) Filed: Dec. 8, 2015

(65) Prior Publication Data
US 2016/0169046 A1  Jun. 16, 2016

Related U.S. Application Data

(60) Provisional application No. 62/090,028, filed on Dec. 10, 2014.

(51) Int. Cl.
*F01D 25/24* (2006.01)
*F01D 25/28* (2006.01)
*F02C 7/20* (2006.01)

(52) U.S. Cl.
CPC .......... *F01D 25/243* (2013.01); *F01D 25/28* (2013.01); *F02C 7/20* (2013.01); *F05D 2220/32* (2013.01); *F05D 2240/50* (2013.01); *F05D 2300/502* (2013.01); *Y02T 50/672* (2013.01)

(58) Field of Classification Search
CPC .................................................. F01D 25/243
USPC ....... 248/554, 555, 556, 557, 644, 674, 675, 248/300, 316.1, 200, 316.8; 244/54
See application file for complete search history.

(56) References Cited

U.S. PATENT DOCUMENTS

| | | | | |
|---|---|---|---|---|
| 5,537,814 A | * | 7/1996 | Nastuk | F01D 5/066 60/796 |
| 5,709,516 A | * | 1/1998 | Peterson | F01D 25/243 267/162 |
| 5,833,417 A | * | 11/1998 | Sargent | F16B 37/046 411/85 |
| 7,631,480 B2 | | 12/2009 | Suciu et al. | |
| 7,793,488 B2 | | 9/2010 | Eleftheriou et al. | |
| 7,902,457 B2 | * | 3/2011 | Johnson | H02G 3/126 174/57 |

(Continued)

FOREIGN PATENT DOCUMENTS

| | | |
|---|---|---|
| EP | 0311155 A2 | 4/1989 |
| EP | 2639159 A2 | 9/2013 |

OTHER PUBLICATIONS

European Search Report dated Jun. 24, 2016 issued in EP Patent Application No. 15197425.0.

*Primary Examiner* — Terrell L McKinnon
*Assistant Examiner* — Michael McDuffie
(74) *Attorney, Agent, or Firm* — Fishman Stewart PLLC

(57) ABSTRACT

A fan casing for a gas turbine includes an improved clipping member for attaching various fan case externals and units. The clipping member may include I-Shaped or C-shaped cross sectional stiffened rib sections that afford enhanced load carrying capabilities while providing mounting surfaces for being connected to structures of the fan case. The I-Shaped or C-Shaped cross sectional stiffened rib also affords an enhanced natural frequency tuning characteristic. Hardware may be formed within the clipping member and become an integral part of the structure which may be tuned to specific design preferences.

20 Claims, 7 Drawing Sheets

(56) References Cited

U.S. PATENT DOCUMENTS

| | | | |
|---|---|---|---|
| 8,021,102 B2 | 9/2011 | Xie et al. | |
| 8,042,342 B2 | 10/2011 | Diochon et al. | |
| 8,113,472 B2* | 2/2012 | Wippler | H05K 5/0204 |
| | | | 248/200 |
| 8,118,252 B2* | 2/2012 | Dumont | B64D 33/04 |
| | | | 244/130 |
| 8,181,419 B1* | 5/2012 | diGirolamo | E04B 2/768 |
| | | | 248/909 |
| 8,398,018 B2 | 3/2013 | Ramlaoui et al. | |
| 8,613,405 B2* | 12/2013 | Lafont | B64D 27/26 |
| | | | 244/54 |
| 8,740,558 B2 | 6/2014 | Robertson, Jr. et al. | |
| RE46,844 E * | 5/2018 | diGirolamo | E04B 1/2403 |
| 10,119,547 B2* | 11/2018 | Rautenstrauch | F04D 19/022 |
| 2005/0051686 A1* | 3/2005 | Payne | F02B 67/04 |
| | | | 248/200 |
| 2007/0057128 A1* | 3/2007 | Michalski, Jr. | B64D 41/00 |
| | | | 248/200 |
| 2009/0184197 A1* | 7/2009 | Cloft | B64D 27/26 |
| | | | 244/54 |
| 2009/0212154 A1* | 8/2009 | Aho-Mantila | B64C 3/32 |
| | | | 244/54 |
| 2010/0117325 A1 | 5/2010 | Lee et al. | |
| 2011/0215220 A1* | 9/2011 | Loebig | B60K 13/04 |
| | | | 248/674 |
| 2012/0119056 A1* | 5/2012 | Dunleavy | B64D 27/26 |
| | | | 248/554 |
| 2012/0248284 A1* | 10/2012 | Bellanger | B64D 29/06 |
| | | | 248/554 |
| 2012/0261543 A1* | 10/2012 | Lee | B60K 17/06 |
| | | | 248/638 |
| 2012/0275913 A1* | 11/2012 | Robertson, Jr. | F01D 25/243 |
| | | | 415/200 |
| 2012/0312954 A1* | 12/2012 | Rodecker | F01N 13/1822 |
| | | | 248/617 |
| 2013/0119191 A1 | 5/2013 | Wolfe et al. | |
| 2013/0323473 A1 | 12/2013 | Dietsch et al. | |
| 2014/0158454 A1* | 6/2014 | Kikuta | B21D 53/88 |
| | | | 180/443 |
| 2014/0173897 A1 | 6/2014 | Alarcon | |
| 2015/0204243 A1 | 7/2015 | Charron et al. | |

\* cited by examiner

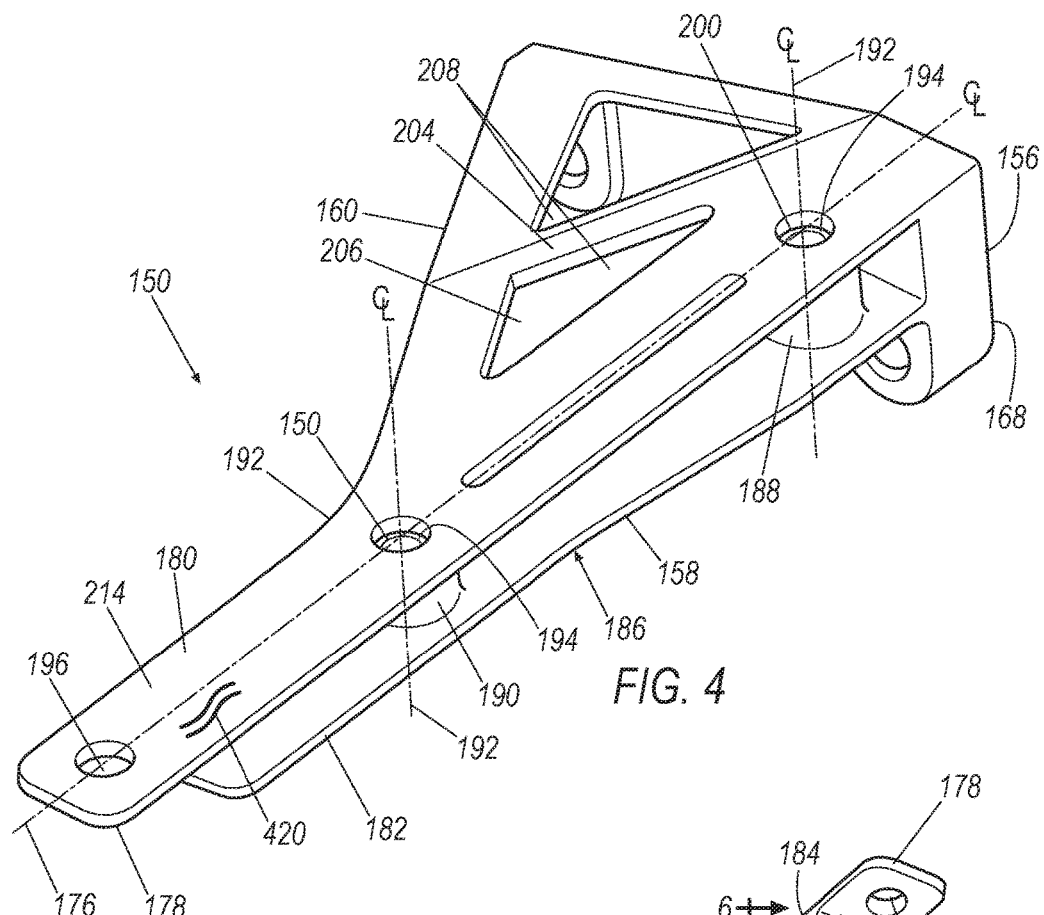
FIG. 4
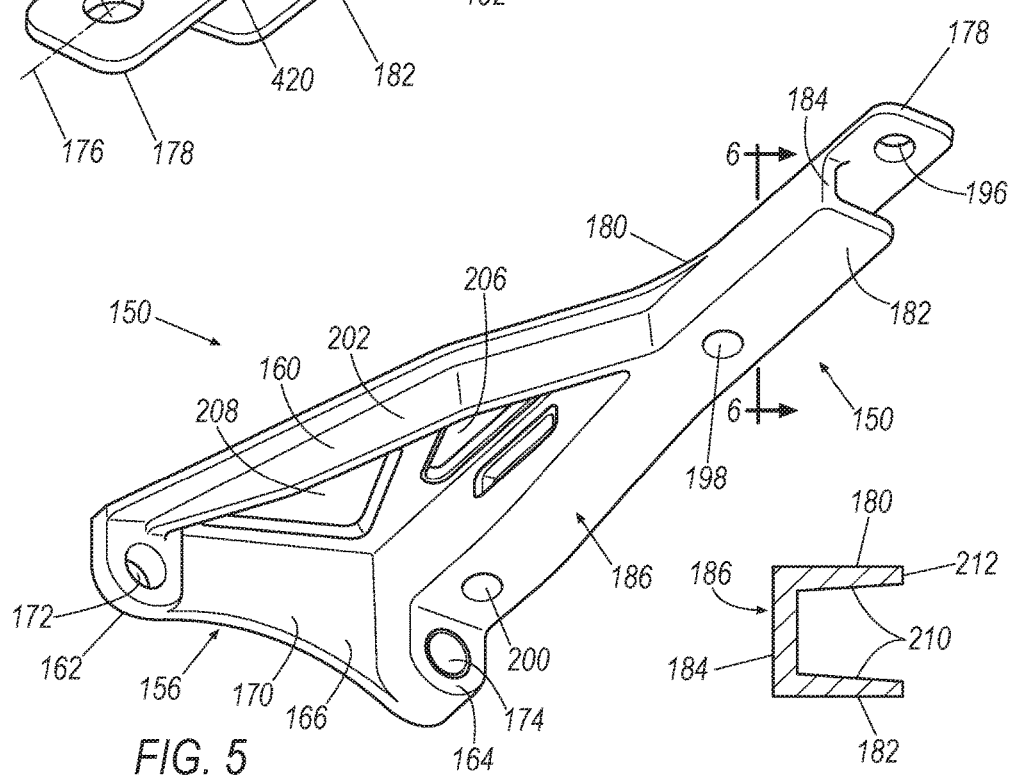 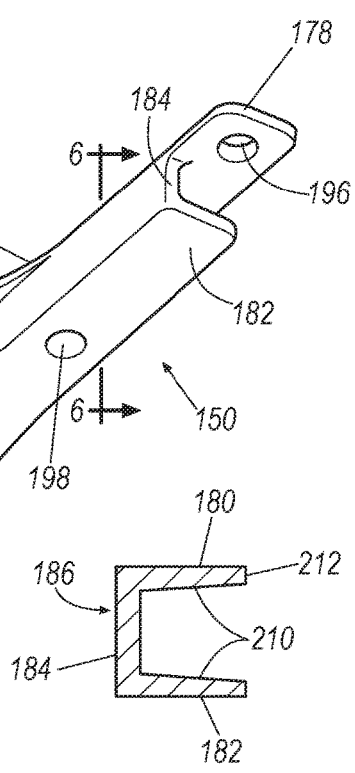
FIG. 5  FIG. 6

STIFFENING RIB

CROSS-REFERENCE TO RELATED APPLICATIONS

This application claims priority to U.S. Provisional Patent Application No. 62/090,028 filed Dec. 10, 2014, the contents of which is hereby incorporated in its entirety.

FIELD OF TECHNOLOGY

The present disclosure relates to a reinforced structure for use with a machine, and more particularly, but not exclusively, to a clipping member having a stiffening rib feature that is made of an injection molded process, the clipping member may be used with an engine casing of a gas turbine.

BACKGROUND

Load bearing clipping members are used in many facets of industry and they are used with machinery to provide support, to provide mounting surfaces for harnesses, and to provide structural integrity. Clipping members are configured to have many shapes and sizes and they may be constructed of many material types depending on the environment in which they must perform. Traditionally load bearing members were manufactured from metal but due to fuel efficiency demands and the desire to reduce weight of components, using composite materials and plastics as the base material for load bearing members have become increasingly more in demand.

In the aircraft industry it has been desirable to reduce weight yet maintain or even improve structural integrity of the aircraft by improving how it is fabricated as well as the processes that are employed to manufacture the aircraft. Gas turbine engines are but one component of the aircraft and each such engine has many load bearing structures, such as brackets, that work to connect various systems together. For example, a gas turbine engine traditionally includes a fan casing that circumscribes the compressor, combustor, turbine blades and other components. The fan casing is comprised of a number of concentrically arranged sections that are connected by a series of fastening hardware.

Providing a clipping points for harness attachment by using metal brackets has the disadvantage of adding weight to the engine while affording moderate load carrying capacity. Such designs further do not provide flexibility of tuning the bracket to have specific performance characteristics that may be suitable for multiple clipping locations. It would be helpful to provide an improved load bearing member that is more economical, is made of light weight material, has a stiffening feature for providing enhanced structural integrity, is made by a high capacity manufacturing process, and has improved load capacity characteristics.

The injection molding high capacity manufacturing process allows for alternative geometric shapes not typically used for sheet metal brackets. Thus, it would be helpful to provide an improved stiffening rib design for use with load bearing members so as to provide the benefits that are sought by industry.

BRIEF DESCRIPTION OF THE DRAWINGS

While the claims are not limited to a specific illustration, an appreciation of the various aspects is best gained through a discussion of various examples thereof. Referring now to the drawings, exemplary illustrations are shown in detail. Although the drawings represent the illustrations, the drawings are not necessarily to scale and certain features may be exaggerated to better illustrate and explain an innovative aspect of an example. Further, the exemplary illustrations described herein are not intended to be exhaustive or otherwise limiting or restricted to the precise form and configuration shown in the drawings and disclosed in the following detailed description. Exemplary illustrations are described in detail by referring to the drawings as follows:

FIG. 4 illustrates a top perspective view of the FIG. 3 clipping member design;

FIG. 5 illustrates a bottom perspective view of the FIG. 3 clipping member design;

FIG. 6 illustrates a cross-sectional view taken from the perspective of arrow 6-6 of FIG. 5, depicting a C-Shaped cross-sectional channel configuration;

DETAILED DESCRIPTION

An exemplary gas turbine engine having a fan case assembly includes clipping members for attaching various fan case externals and units. The clipping member may be manufactured using injection molding techniques wherein fasteners and inserts may be formed as a part of the clipping member. The clipping member includes a mounting portion for engaging and being connectable to a flange portion of the fan casing assembly. The clipping member further includes a main body extending normal to the mounting portion, the main body having a reinforced rib of an I-shaped or C-shaped geometric configuration for providing structural rigidity and clipping locations.

The clipping member may be tuned to have sufficient performance characteristics by modifying the reinforce rib along the body so as to meet any natural frequency requirements. Changes in either height or width for the I or C-shaped rib designs allow tuning of specific natural frequency modes. In the case of space requirements, and height or width cannot be changed, material thickness can be changed that will also allow for tuning of the natural frequencies.

Figure 1:
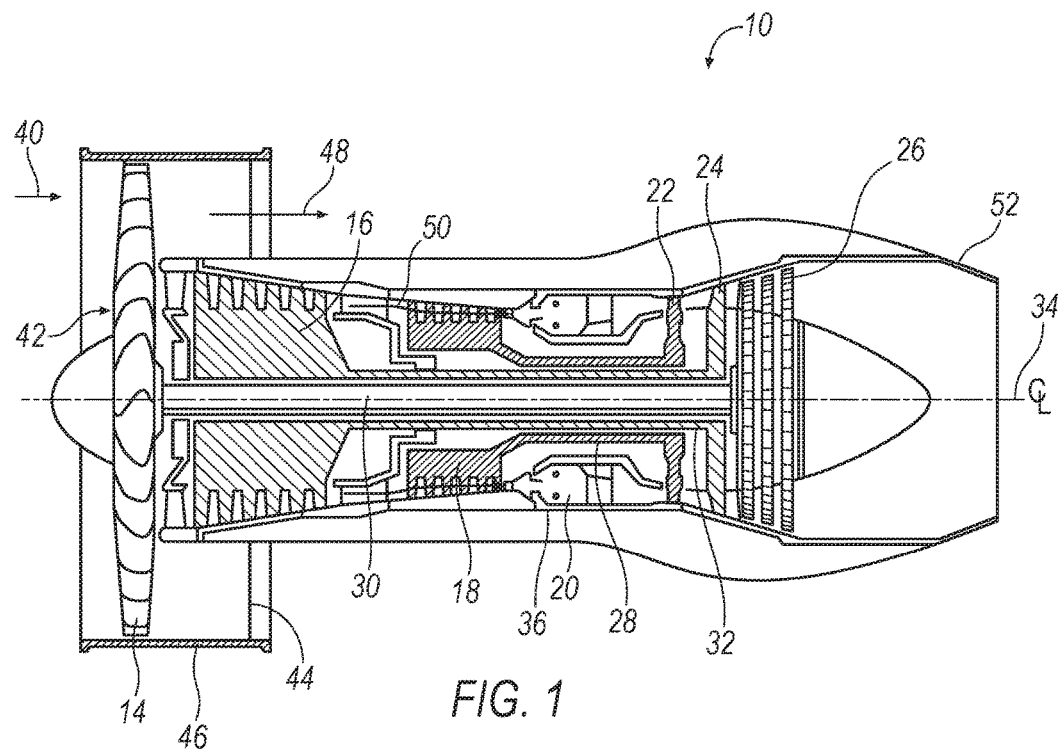
FIG. 1 schematically illustrates a gas turbine engine having a fan casing with an improved clipping member, in accordance with one non-limiting exemplary embodiment of the present disclosure.

FIG. 1 illustrates a gas turbine engine 10, which includes a low pressure compressor 14 ("LP compressor"), an intermediate pressure compressor 16 ("IP compressor"), a high pressure compressor 18 ("HP compressor"), a combustor 20, a high pressure turbine 22 ("HP turbine"), an intermediate pressure turbine 24 ("IP turbine") and low pressure turbine 26 ("LP turbine"). The HP compressor 18, the IP compressor 16 and the LP compressor 14 are connected to a respective one of an HP shaft 28, an IP shaft 30 and a LP shaft 32, which in turn are connected to a respective one of the HP turbine 22, the IP turbine 24 and the LP turbine 26. The shafts extend axially and are parallel to a longitudinal center line axis 34.

While FIG. 1 illustrates a three shaft engine, it will be appreciated that other embodiments can have configurations including more or less than three shafts. During general operation of the engine 10, ambient air 40 enters the LP compressor 14 and is directed across a fan rotor 42 in an annular duct 44, which in part is circumscribed by fan case 46 assembly. The bypass airflow 48 provides a fraction of engine thrust while the primary gas stream 50 is directed to the combustor 20 and the turbines 22, 24, 26, and then exhausted through a nozzle 52 generating thrust. The engine fan case assembly 46 circumscribes the fan rotor 42 and compressor 16 and is made of several stacked sections. The sections are shown joined with an attached clipping member 150 having the stiffening rib section discussed herein.

Figure 2:
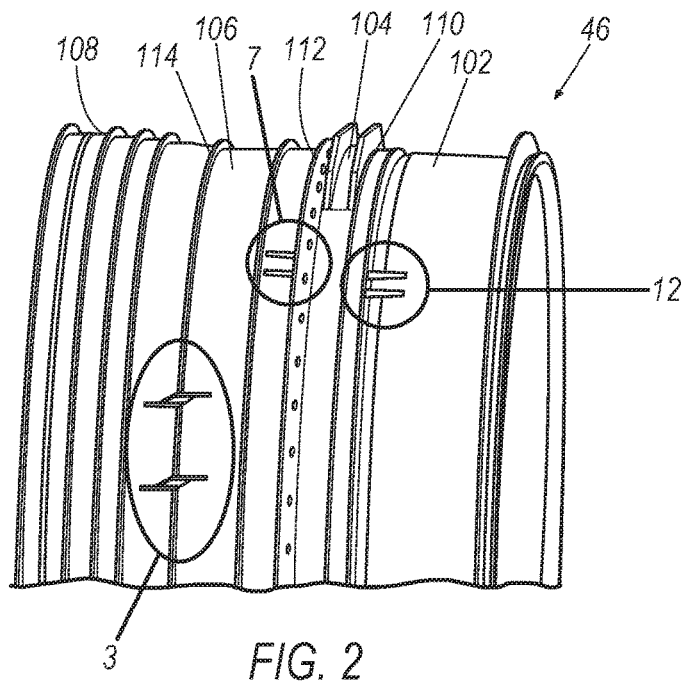
FIG. 2 is a perspective view of the fan casing shown in FIG. 1, illustrating several locations where an improved clipping member may be employed.

FIG. 2 illustrates the fan casing assembly 46 as shown in FIG. 1, however here depicting an enlarged perspective view of one portion of an exemplary fan casing. The fan casing assembly 46 may include a number of integral sections, for example, a first section 102, a second section 104, a third section 106, and a fourth section 108. The fan casing assembly 46 further includes a first flange mounting surface 110, a second flange 112 and a third flange 114. Each such flange provides a mounting surface that butts up against the adjacent fan casing section. Shown in FIG. 2 are a series of load bearing, clipping members or brackets, having different configurations for use at the different fan casing assembly sections. For example, the circle shown as circle 3, shows one exemplary clipping member configuration that is shown in further detail in FIG. 3. The circle identified by circle 7, shows yet an alternative exemplary load bearing clipping member which is shown in greater detail in FIG. 7. Likewise, as shown in the detail of circle 12, yet another alternative load bearing clipping member is depicted, which can be seen in further detail herein at FIG. 12.

Each such load bearing clipping member operates to supply clipping points for fan case externals and units. The clipping members are made of a non-flammable substance as the load bearing clipping members are positioned in a fire zone.

Figure 3:
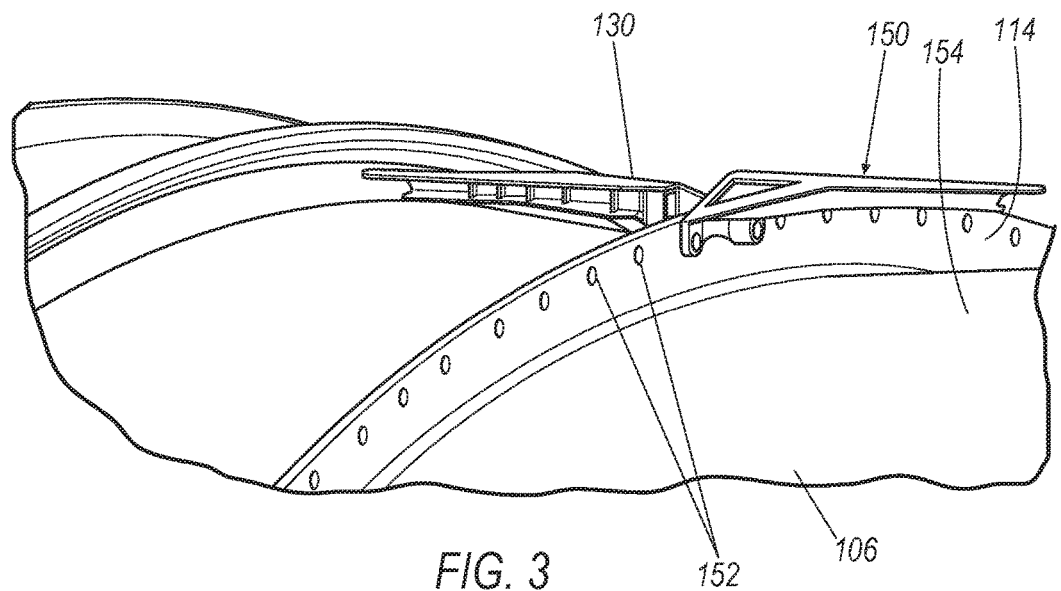
FIG. 3 illustrates an enlarged perspective view of one exemplary clipping member mounted to a fan casing, having an improved stiffening rib design.

FIG. 3 illustrates an enlarged perspective view of the FIG. 2 fan casing assembly 46, however here the clipping member 150 is shown connected to a flange 114 of the third casing section 106. The flange 114 has a plurality of holes 152 that extend around the circumference 154 of the fan casing. The holes 152 provide mounting locations for each such clipping member 150 to be secured thereto. The mounting holes 152 extend around the entire circumference of the fan casing assembly 46, which allows the clipping members 150 to be placed at various locations, based upon desired engineering conditions. Bolts and other fasteners (not shown), are used to secure the clipping member 150 to the flange 114. A pair of brackets 150 are located on each side of the flange 114, and the fasteners (not shown) are utilized to connect the pair of brackets 150 back to back to the flange 114 in the desired locations. The mounting of the clipping member 150 to the flange 114 around the circumference 154 of the fan casing is completed in a similar fashion.

With reference to FIG. 4, a perspective view of the clipping member 150 is depicted, showing the top features of the structure. The clipping member 150 includes a mounting flange section 156, a main body portion 158, and a cross-support member 160. FIG. 5 illustrates the clipping member 150 from a bottom perspective view. As can be seen in both FIGS. 4 and 5, the mounting flange section 156 includes a first boss 162, a second boss 164 and a middle portion or mounting flange 166. The mounting flange 166 has a back surface 168 and a front surface 170. The back surface 168 is structured to mate against the flange 114 of the engine casing 46. The first boss 162 has a first mounting hole 172 and the second boss 164 has a second mounting hole 174, each of which are operable to receive a fastener for aiding and securing the clipping member 150 to the flange of the fan casing.

The main body section 158 of the clipping member 150 includes a longitudinally extending axis 176 that extends from the mounting flange section 156 to the distal end 178. The main body section 158 further includes an upper surface 180, a lower surface 182 and a middle or intermediary portion 184 connecting the upper surface 180 and the lower surface 182, together. These surfaces combine to form a c-shaped channel 186. The c-shaped channel is shown in FIG. 6, which is taken from the perspective of arrow 6-6 of FIG. 5. The c-shaped channel 186 extends substantially the entire longitudinal axis 176 of the clipping member 150. The c-shaped channel allows for the frequency tuning feature discussed earlier.

Also formed as part of the main body 158 are a pair of bosses 188 and 190, each of which has a center line 192 extending there through, that is substantially perpendicular to the longitudinal axis 176. Each boss, 188 and 190, is formed part of, and integral with, the c-shaped channel 186. Each boss extends between the upper surface 180 and the lower surface 182, at spaced apart locations along the longitudinal axis 176 of the main body section 158. Each boss has a cavity formed therein, and which is operable to receive a fastener member 194, for example a threaded member, a nut, etc., that can be permanently affixed relative to the clipping member 150. Once formed, the fastener member 194 becomes a permanent component of the clipping member 150. Here, the example shown is a fastener 194 of the captivated nut type configuration. The captivated nut is formed part of the boss 188, 190, during the manufacturing process, which allows the captivated nut to be permanently secured to the clipping member 150.

The main body 158 further includes a distal portion 178 that includes a mounting hole 196. Another hole 198 extends through the c-shaped channel 186 as does the hole 200. The holes 196, 198 and 200 provide for mounting or securing of structures to the clipping member 150. Such structures may be components of a fan casing for a gas turbine engine.

The clipping member 150 further includes a cross-support rib 160 that extends from the mounting flange section 156 to a side wall of the main body 158. The cross support 160 has a rib 202 which provides structural rigidity to the clipping member 150. Reinforcement section 204 extends from the main body portion 158 and connects with the cross support 160 to define a first 206 and second opening 208. The openings provide a removal area where material is not provided, so as to reduce the overall weight of the clipping member 150. The clipping member 150 further has other portions where material has been removed so as to reduce weight of the overall structure, as well as to provide structural integrity enhancements to the overall performance of the clipping member 150. It will be appreciated that while the clipping member 150 is shown herein being used in connection with a fan casing of a gas turbine engine, the member 150 may be used in other locations on the machine, and with other machines and places in industry and commerce.

As shown in FIG. 6, the c-shaped channel 186 includes an outer surface having an upper surface 180, and inner surface 184 and a lower surface 182, that are substantially planer. However, the inside portion of the c-channel 186 includes tapered walls 210 that start at an outermost end 212 and slope inwardly toward the middle section 184. This relief angle assists in the molding of the part as well as provides an area for removal of the finished member 150 from the mold tooling.

Figure 7:
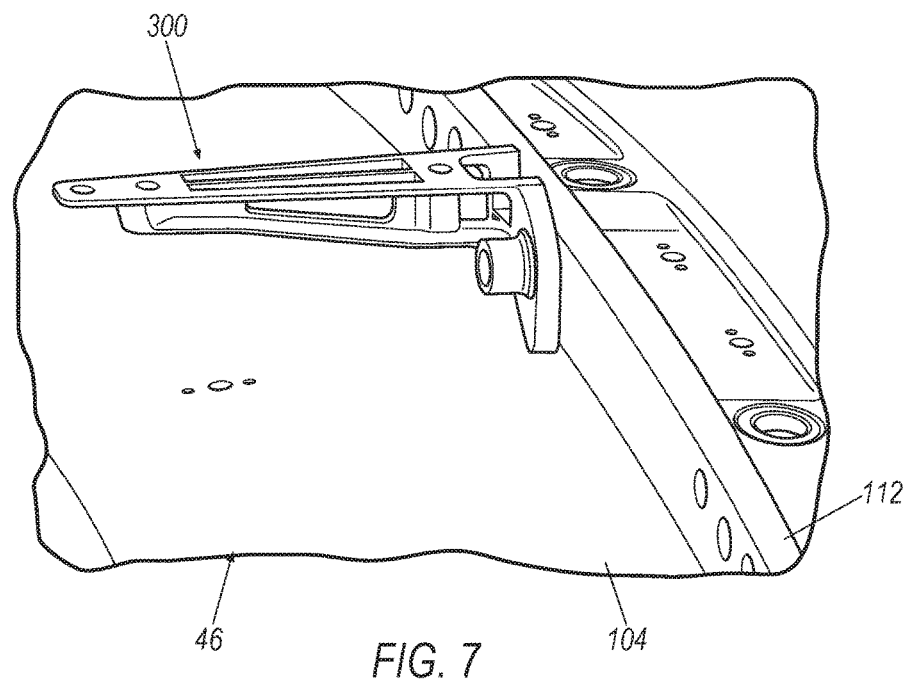
FIG. 7 illustrates a side perspective view of an alternative clipping member design mounted to a fan casing.

FIG. 7 illustrates an alternative clipping member assembly 300 that is show mounted to a flange 112 of the second section 104 of the fan casing assembly 46. This alternative clipping member 300 is taken from the perspective of circle 7 shown in FIG. 2. In this exemplary embodiment 300, the clipping member 300 is shown secured to flange 112 in just one location. It will be appreciated that the clipping member 300 may be secured to the flange 112 at numerous locations around the circumference of the fan casing assembly 46.

Figure 8:
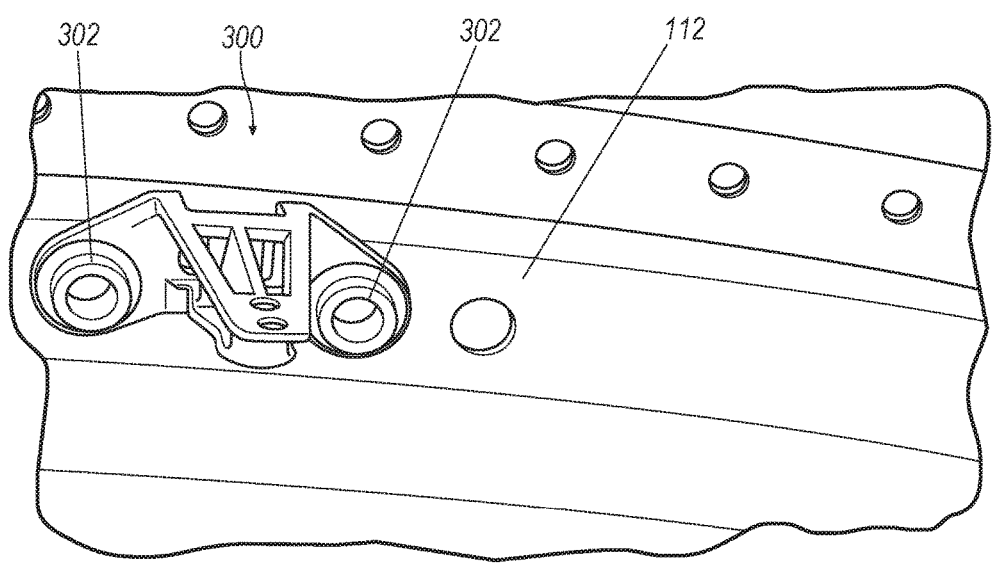
FIG. 8 illustrates a front perspective view of the FIG. 7 clipping member design, shown mounted to a fan casing.

FIG. 8 illustrates a front perspective view of the clipping member 300 that is shown in FIG. 7, along with the clipping member 300 in position relative to the flange 112. Here integral bushings 302 are used with bolts and fasteners (not shown) to connect the clipping member 300 to the flange 112. It will be appreciated that other integral parts apart from the bushings 302 could be employed to secure the clipping member 300 to the flange 112.

Figure 9:
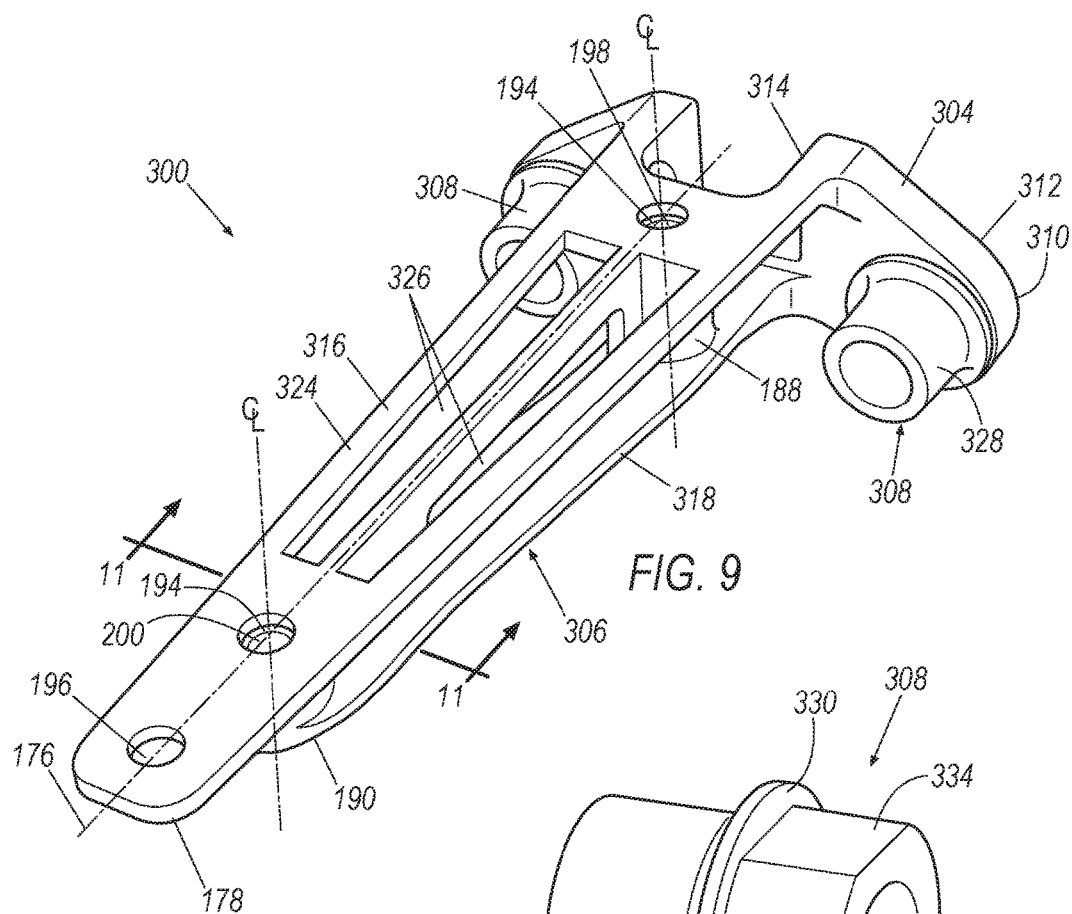
FIG. 9 illustrates a perspective view of the FIG. 7 alternative clipping member design.

FIG. 9 illustrates the FIG. 7 slipping member 300, however in a perspective view with the fan casing removed. The mounting member 300 includes a flange portion 304, a body portion 306 and bushings 308 that are secured to, or integral with, the flange portion 304. A pair of bushings 308 are located on opposite sides of the flange portion 304, and are operable to help secure the clipping member 300 to the fan casing flange 112.

The flange portion 304 includes a first section 310 that has an opening 312, the opening 312 being sufficiently large enough to receive a portion of the bushing 308. The flange portion 304 further includes a u-shaped opening 314 that provides an open space where material is removed so as to reduce the weight of the clipping member 300.

The body portion 306 includes a longitudinal axis 176 extending a substantial length of the clipping member 300. The body portion 306 starts at the mounting flange portion 304, and extends to a distal end 178 of the body 306. The body portion 306 further includes an upper surface 316, a lower surface 318 and a middle section 320. The upper surface 316, lower surface 318 and middle section 320 are formed to create an I-shaped section 322 that collectively forms a unified, one piece, unitary, stiffening rib that extends along the longitudinal axis 176 of the clipping member 300. The I-shaped section 322 allows for the tuning feature discussed above.

The upper surface 316 includes a tapered section 324, when viewed from the top perspective view. The broader section being located towards the mounting flange portion 304, and the more narrow section being located toward the distal end 178. The upper surface 316 further includes openings 326 that extend axially, and provide a space for material to be removed so as to reduce weight of the clipping member 300.

The main body 306 further includes a boss 188 and 190 which are formed part of the body portion 306. A captivated fastener, for example a nut 194, is located within each boss, and provides a receptacle for a fastener to be threaded thereto. Mounting hole 196 is located at the distal end 178 of the body 306 and provides a mounting location for other fan casing structures to be secured thereto. It will be appreciated that additional bosses, captivated fasteners, and other holes may be provided and are within the spirit of this disclosure.

Figure 10:
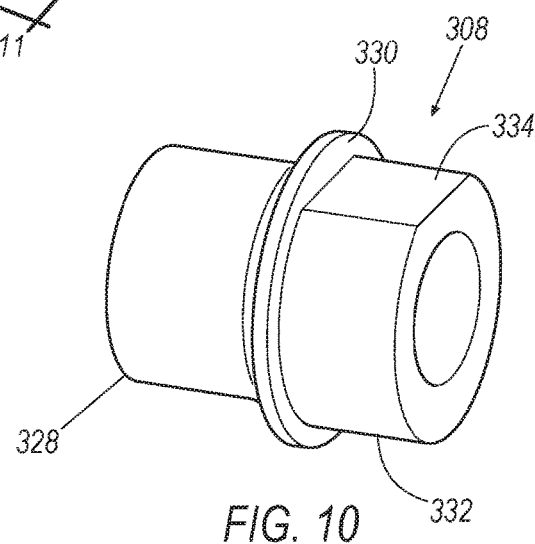
FIG. 10 illustrates a bushing that may be used with the FIG. 9 device.

The bushing 308 that is secured to the mounting flange portion 304, is shown in FIG. 10. The bushing 308 includes a circular shaped portion 328, a rest or flange 330, and a second circular shaped portion 332 that includes a flat 334 on an upper portion thereof. The second circular shaped portion 332 may be inserted within the opening 312 of the mounting flange portion 304. The flat 334 provides an anti-rotation feature and an alignment feature, for positioning the bushing 308 relative to the mounting flange portion 304. The bushing 308 is preferably made of a stainless steel or titanium, however, it will be appreciated that it may be made of other materials It will be appreciated that the bushing 308 may be formed as a part of the member 300 at the time the part is molded or inserted using one of many industry standard insertion methods after molding has been completed.

Figure 11:
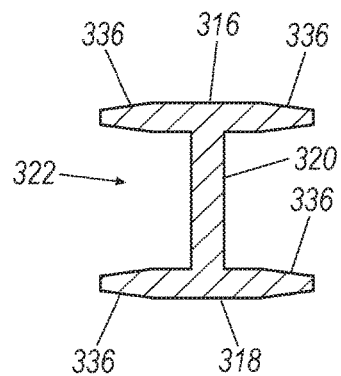
FIG. 11 illustrates a cross-sectional view taken from arrow 11-11 of FIG. 9, showing an I-Shaped cross-sectional channel configuration.

FIG. 11 illustrates a cross-sectional view of the I-shaped section 322 taken from arrows 11-11 of FIG. 9. The I-shaped cross-section 322 includes the upper portion 316, middle section 320 and the lower section 318. Relief angles 336 are provided to help aid in the forming of the clipping member 300. It will be appreciated that other relief angles 336 may be contemplated. The relief angles 336 also provide for sloped surfaces to permit the removal of the finished member 300 from the mold tooling.

Figure 12:
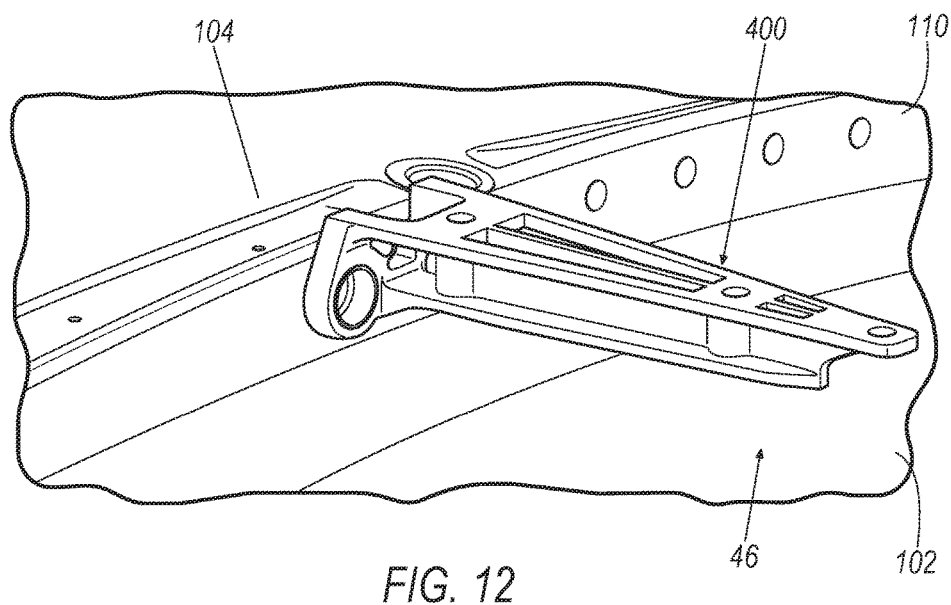
FIG. 12 illustrates another alternative clipping member design that is used in connection with a fan casing.

FIG. 12 illustrates an alternative clipping member 400 that is shown connected to a flange 110 of a fan casing 46. The FIG. 12 embodiment is taken from the perspective of circle 12 of FIG. 2, and thus this is one potential location and use of this device. This alternative clipping member 400 is mounted to the flange 110 and where connecting fan casing sections 102 and 104 are joined together. The clipping member 400 may be connected to the flange 110 using conventional fasteners not shown.

Figure 13:
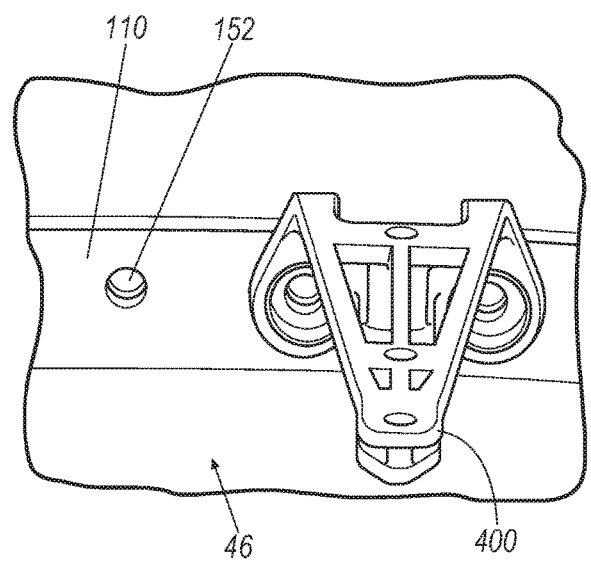
FIG. 13 illustrates a front perspective view of the FIG. 12 clipping member; shown mounted to a fan casing.

FIG. 13 illustrates a enlarged large prospective view of the FIG. 12 device, from the front perspective view of the clipping member 400, showing it connected to the flange 110. It will be appreciated that a plurality of clipping members 400 may be secured around the circumference of the fan casing 46 at various locations, depending upon where the holes 152 are located.

Figure 14:
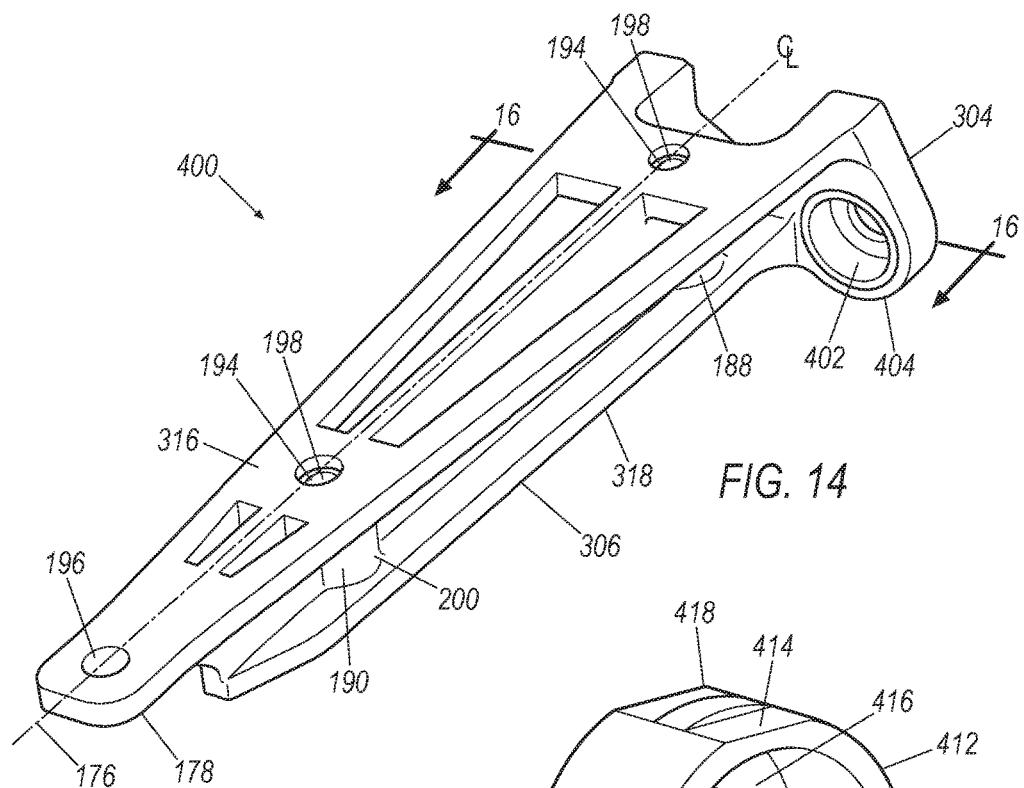
FIG. 14 illustrates a perspective view of the alternative clipping member of FIG. 12.
Figure 15:
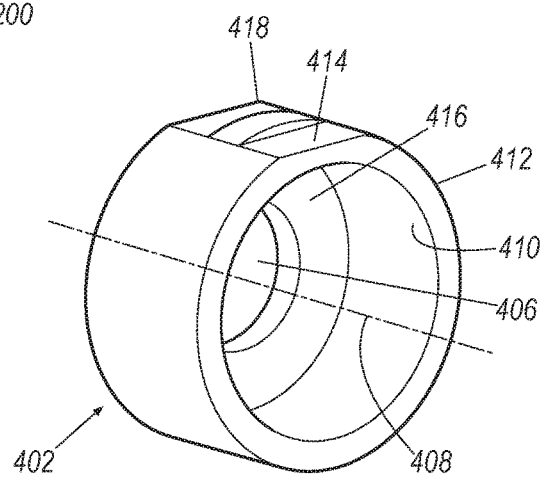
FIG. 15 illustrates a washer insert that may be used with the alternative clipping member of FIG. 12.

FIG. 14 illustrates a perspective view of the FIG. 7 embodiment, but with the fan casing removed. Here, the alternative clipping member 400 includes similar components of that shown in the FIG. 9, clipping member 300. Accordingly, where possible, like numbers have been utilized. For example, the clipping member 400 includes a mounting flange portion 304, a body portion 306, and an I-shaped cross section 322.

A difference between the FIG. 9 and FIG. 14 clipping members, can be found in the modified mounting flange portion 304. In particular, the mounting flange 304 includes a cup washer 402 which may be received within a recess 404 that is formed as part of the mounting flange 304. The cup washer 402 has an opening 406 and a center line 408 for permitting a fastening member to pass there through. The fastening member, not shown, further connects to the flange of the fan casing. The cup washer has an inside diameter 410, an outside diameter 412, and a flat portion 414. An internal wall 416 is located on an innermost surface of the cup washer 402, and provides a surface for a head of a fastener (not shown) to engage. The flat 414 is operable to engage a corresponding flat (not shown) in a surface of the recess 404. The corresponding flats operate to allow the cup washer 402 to be secured, and not rotate, relative to the mounting flange 304. The cup washer 402 may be made of a stainless steel or titanium material. The cup washer 402 may be molded in as an insert within the clipping member 400 during the manufacturing process. A ridge 418 is provided near the flat 414, so as to provide a space that plastic is formed around during the molding process. It will be appreciated that the cup washer 402 could be press fit within the recess 404, as opposed to being a molded insert.

Figure 16:
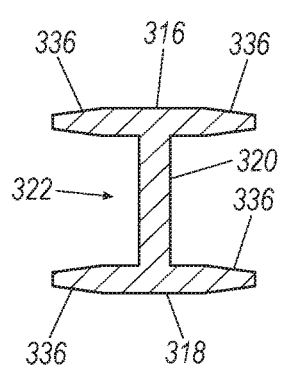
FIG. 16 illustrates a cross-sectional view taken from arrow 16-16 of FIG. 14, showing an I-Shaped cross-sectional channel configuration.

FIG. 16 illustrates an I-shaped cross-section 322 showing a stiffened rib configuration that extends along the longitudinal access 176. The cross section 322 shown in FIG. 16, is substantially similar to that depicted in FIG. 11. As such, like numbers have been referred to herein. The I-shaped stiffened rib from clipping member 400 provides the same tuning features as member 300.

The process of manufacturing the clipping members 150, 300 and 400, is presented. One manufacturing process includes using injection molding so as to form a unitary part. With reference to the FIG. 4 part, the part would be injected running along the longitudinal access 176. Hot molten plastic material would flow in a tool from the distal end 178 towards the mounting flange section 156, or vice versa, during the injection process. Plastic fibers 420 forming part of the hot molten plastic material having chopped fibers that will extend parallel to the flow of the plastic during the injection process. The I and C shaped stiffened ribs lend themselves to this process as the fibers will align to the longitudinal axis 176 throughout the rib. Exemplary material types could include PEEK thermoplastic with a percentage of carbon fibers. It will be appreciated that other combinations of plastics and fibers could be employed for this injection molding process. Tooling for the injection molding machine can be modified so as to provide various thickness of the part to achieve specific characteristics if necessary. The length of the clipping member along the longitudinal axis 176 may be sectioned into different nodes. The stiffening rib along the longitudinal axis 176 can be configured by adjusting the amount of material, or thickness, in one section of the I or C shaped stiffened rib. The result of which is that the stiffness properties can be altered. This permits the design to be 'tuned' to a particular design that meets any natural frequency requirements of the part. By tuning the part to address frequency attributes, sound vibration noises, for example, can be minimized. Further, by tuning each node to a desired performance, the member may have enhanced load carrying characteristics.

All terms used in the claims are intended to be given their broadest reasonable constructions and their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary.

What is claimed as new and desired to be protected by Letters Patent of the United States is:

1. A bracket member for a gas turbine engine, comprising:
   a mounting flange having a first and second section, each section having a bore for receiving a fastener;
   a main section integral with the mounting flange, the main section extending along a longitudinal axis from the mounting flange, the main section having a reinforced rib shaped section extending along the longitudinal axis;
   a molded in nut that is part of the main section; and
   wherein the main section has a distal portion with a mounting hole.

2. The bracket member of claim 1, wherein the reinforced rib shaped section includes an upper surface, a lower surface, and a middle section connecting the upper surface and the lower surface together.

3. The bracket member of claim 2, wherein the reinforced rib shaped section is I-shaped, the I-shaped section extends substantially the length of the main section along the longitudinal axis that allows for the tuning of natural frequencies.

4. The bracket member of claim 2, wherein the reinforced rib shaped section is C-shaped, the C-shaped section extends substantially the length of the main section along the longitudinal axis that allows for the tuning of natural frequencies.

5. The bracket member of claim 2, further comprising a bushing located in the bore of the mounting flange, the bushing has a flat portion for mating with a corresponding flat portion in the bore of the mounting flange.

6. The bracket member of claim 2, further comprising a washer that is insertable within the bore of the mounting flange, the washer has a cup-shaped portion.

7. The bracket member of claim 1, further comprising at least one reinforced opening in a top surface of the main section.

8. The bracket member of claim 7, further comprising a cross support member extending between the mounting flange and the distal portion of the main section, wherein the at least one reinforced opening is disposed between the cross support member and the reinforced rib shaped section.

9. The bracket member of claim 2, wherein the reinforced rib shaped section further includes a boss extending between the upper surface and the lower surface, and wherein the nut is located within the boss.

10. The bracket member of claim 1, further comprising a polymer material that is made of fibers, the fibers extend in a direction along a longitudinal axis of the member, the fibers extend from the mounting flange to a distal end of the main section of the member, to form an integral one piece member.

11. The bracket member of claim 1, wherein the member is at least one of injection molded and composed of a PEEK carbon fiber filled composite material.

12. A fan casing comprising the bracket member of claim 1.

13. A gas turbine engine comprising:
   a fan casing, at least one section of the fan casing having a flange;
   a bracket member made of one continuous piece of material, the bracket member including a mounting flange, a body portion extending along a longitudinal axis from the mounting flange, and at least one captivated nut; and wherein the body portion includes a stiffening rib section extending along the longitudinal axis, the rib section has an upper surface, a lower surface, and a middle member that connects the upper surface and the lower surface, the stiffening rib section further includes a fastener portion that extends between the upper surface and the lower surface, the fastener portion houses and retains the at least one captivated nut.

14. The gas turbine engine as claimed in claim 13, wherein the stiffening rib section has a geometric configuration, when viewed from a front cross sectional view, that is either a C-shaped or I-shaped geometric configuration.

15. The gas turbine engine as claimed in claim 13, wherein the bracket member further includes a cross support rib extending from the mounting flange towards a distal end of the body portion.

16. A fan casing bracket member for a gas turbine engine comprising:
  a mounting flange portion for being connected to a flange portion of a fan casing, the mounting flange portion including first and second mounting holes; and
  a main body portion extending along a longitudinal axis outwardly from the mounting flange portion, the main body portion including:
  a longitudinally extending top surface that extends from the mounting flange portion to a distal end of the main body portion,
  a longitudinally extending lower surface that extends from the mounting flange portion towards the distal end,
  a longitudinally extending middle section that extends between the top surface and the lower surface,
  a boss that extends between the top surface and the lower surface, the boss includes a space for retaining a fastener,
  wherein the top surface, the lower surface, and the middle section collective define a stiffening rib section that extends along the longitudinal axis of the main body portion.

17. The fan casing bracket member as claimed in claim 16, further comprising at least one captivated nut retained in the boss.

18. The fan casing bracket member as claimed in claim 17, wherein the main body portion has a cross sectional shape that is one of a C-shaped configuration or an I-shaped configuration.

19. A bracket member for a gas turbine engine, comprising:
  a mounting flange having a first and second section, each section having a bore for receiving a fastener;
  a main section integral with the mounting flange, the main section extending along a longitudinal axis from the mounting flange, the main section having a reinforced rib shaped section extending along the longitudinal axis;
  a molded in nut that is part of the main section;
  at least one reinforced opening in a top surface of the main section;
  a cross support member extending between the mounting flange and a distal portion of the main section; and
  wherein the at least one reinforced opening is disposed between the cross support member and the reinforced rib shaped section.

20. The bracket member of claim 19, wherein the cross support member comprises a rib extending from the mounting flange to a side wall of the main section.

* * * * *